US012754288B2

(12) United States Patent
Beuth et al.

(10) Patent No.: US 12,754,288 B2
(45) Date of Patent: Oct. 6, 2026

(54) PRODUCING A MEASUREMENT DATA SET BY MEANS OF AN ACTIVE SENSOR SYSTEM

(71) Applicant: Valeo Schalter und Sensoren GmbH, Bietigheim-Bissingen (DE)

(72) Inventors: Thorsten Beuth, Bietigheim-Bissingen (DE); Christoph Parl, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 818 days.

(21) Appl. No.: 18/019,159

(22) PCT Filed: Jul. 27, 2021

(86) PCT No.: PCT/EP2021/070947
§ 371 (c)(1),
(2) Date: Feb. 1, 2023

(87) PCT Pub. No.: WO2022/028945
PCT Pub. Date: Feb. 10, 2022

(65) Prior Publication Data

US 2023/0324513 A1 Oct. 12, 2023

(30) Foreign Application Priority Data

Aug. 4, 2020 (DE) ..................... 10 2020 120 542.2

(51) Int. Cl.
*G01C 3/08* (2006.01)
*G01S 7/48* (2006.01)

(52) U.S. Cl.
CPC .................................. *G01S 7/4802* (2013.01)

(58) Field of Classification Search
CPC ..................................................... G01S 7/4802
See application file for complete search history.

(56) References Cited

U.S. PATENT DOCUMENTS

2018/0067195 A1* 3/2018 Slobodyanyuk ...... G01S 7/4815
2019/0227168 A1* 7/2019 Low ........................ G01S 17/87
(Continued)

FOREIGN PATENT DOCUMENTS

DE 102014004787 A1 10/2015
DE 102016220075 A1 4/2018
WO WO 2015149929 A1 * 8/2015 ........... G01S 17/894

OTHER PUBLICATIONS

Castaneda et al.; "Stereo Time-of-Flight with Constructive Interference;" IEEE Transactions on Pattern Analysis and Machine Intelligence; vol. 36, No. 7; Jul. 1, 2014; pp. 1402-1413 (12 pages).
(Continued)

*Primary Examiner* — Mark Hellner
(74) *Attorney, Agent, or Firm* — Osha Bergman Watanabe & Burton LLP

(57) ABSTRACT

An active sensor system (1) has a first and a second emitter unit (2, 2'), as well as a detector unit (3, 3') and a computing unit (4). The emitter units (2, 2') are configured to emit respective measurement signals into corresponding emission spatial regions (A1, A2). The detector unit (3, 3') is configured to generate at least one detector signal on the basis of reflected portions of the measurement signals, and the computing unit (4) is configured to generate a measurement data set on the basis of the at least one detector signal. The computing unit (4) is configured to identify at least one section (T1, T1', T2) that is shaded with respect to at least one of the emitter units (2, 2'). The computing unit (4) is configured to generate the measurement data set taking into account the section (T1, T1', T2) and/or to generate correction data for correcting the measurement data set.

14 Claims, 2 Drawing Sheets

(56) References Cited

U.S. PATENT DOCUMENTS

| | | | | |
|---|---|---|---|---|
| 2020/0249354 | A1* | 8/2020 | Yeruhami | G01S 7/4815 |
| 2021/0041562 | A1* | 2/2021 | Hassibi | G01S 7/4815 |
| 2021/0389467 | A1* | 12/2021 | Eshel | G01S 7/497 |

OTHER PUBLICATIONS

International Search Report and Written Opinion in corresponding International Application No. PCT/EP2021/070947, mailed Oct. 20, 2021 (18 pages).

* cited by examiner

PRODUCING A MEASUREMENT DATA SET BY MEANS OF AN ACTIVE SENSOR SYSTEM

BACKGROUND

The present invention relates to an active sensor system having a first emitter unit, a second emitter unit, a detector unit and a computing unit, wherein the first emitter unit is configured to emit a first measurement signal into a first emission spatial region in an environment of the sensor system, the second emitter unit is configured to emit a second measurement signal into a second emission spatial region in the environment, a sensor field of view is given by a first overlapping region of the first emission spatial region with a detector field of view of the detector unit and by a second overlapping region of the second emission spatial region with the detector field of view, the detector unit is configured to generate at least one detector signal on the basis of portions of the first measurement signal and/or of the second measurement signal which are reflected in the sensor field of view, and the computing unit is configured to generate a measurement data set on the basis of the at least one detector signal. The invention also relates to an object characterization system having an active sensor system, to a method for generating a measurement data set by means of an active sensor system, and to a method for characterizing objects by means of an active sensor system, and to a computer program product.

Active sensor systems are distinguished by the fact that they can emit measurement signals and receive measurement signals reflected by an object in order to determine corresponding spatial information about the object or the environment of the sensor system.

Active sensor systems having a plurality of active sensors, for example laser scanners, are known from the prior art. This enables an enlarged detection range of the sensor system and measurement inaccuracies can be compensated for by redundancies if necessary.

The document DE 10 2016 220 075 A1 specifies, for example, a motor vehicle having a sensor arrangement for 360° detection of an environment. The sensor arrangement has a plurality of sensors of the same type, for example laser scanners. In certain regions, redundant sensor data are provided by overlapping detection ranges of the individual sensors, as a result of which a higher resolution can be provided in the corresponding regions or measurement uncertainties can be compensated for.

A disadvantage of sensor systems having a plurality of active sensors is that a spatial region that is shaded by an object in the environment of the sensor system, so that measurement signals from one of the sensors cannot reach the region, cannot effectively be used for object detection or object characterization, or only with lower reliability. For example, reflections from this spatial region that are detected with another of the sensors can be incorrectly interpreted as noise, even though they are generated by another object in the shaded region.

Against this background, it is an object of the present invention to specify an improved concept for generating a measurement data set by means of an active sensor system having at least two emitter units, which enables greater reliability when generating the measurement data set and/or when processing the measurement data set further.

SUMMARY

In the present case, this object is achieved by the respective subject matter of the independent claims. Advantageous developments and preferred embodiments are the subject matter of the dependent claims.

The improved concept is based on the idea of identifying, on the basis of detector signals that trace back to reflected portions of measurement signals emitted by the emitter units, at least one section of a sensor field of view of the active sensor system that is shaded at least with respect to one of the emitter units. The measurement data set can then be generated on the basis of this. Alternatively or additionally, correction data can be generated for the measurement data set or for further processing of the measurement data set.

According to the improved concept, an active sensor system having a first emitter unit, a second emitter unit, a detector unit and a computing unit is specified. The first emitter unit is configured to emit a first measurement signal into a first emission spatial region in an environment of the sensor system. The second emitter unit is configured to emit a second measurement signal into a second emission spatial region in the environment. A sensor field of view of the active sensor system is given by a first overlapping region of the first emission spatial region with a detector field of view of the detector unit and by a second overlapping region of the second emission spatial region with the detector field of view. The detector unit is configured to generate at least one detector signal on the basis of portions of the first measurement signal and/or of the second measurement signal which are reflected in the sensor field of view, in particular portions reflected by one or more objects in the sensor field of view. The computing unit is configured to generate a measurement data set on the basis of the at least one detector signal. The computing unit is configured to identify, on the basis of the at least one detector signal, at least one section of the sensor field of view that is shaded with respect to the first emitter unit and/or is shaded with respect to the second emitter unit. The computing unit is configured to generate the measurement data set taking into account the at least one section and/or to generate correction data for correcting the measurement data set on the basis of the at least one section.

In particular, only those objects in the environment of the sensor system which, on the one hand, are in the detector field of view of the detector unit and, on the other hand, can be reached by the first measurement signal and/or the second measurement signal can be detected by the sensor system. The latter is not the case if the object is outside the first emission spatial region and outside the second emission spatial region or if the object is shaded with respect to both emitter units or all emitter units of the sensor system.

The measurement signals can be, for example, electromagnetic waves, in particular light waves or radio waves. However, the measurement signals can also be mechanical waves, for example sound waves or ultrasonic waves.

Accordingly, the active sensor system can be, for example, an active optical sensor system, for example a LIDAR system, or a radar system or an ultrasonic sensor system.

In the case of an active optical sensor system, the emitter units are designed in particular as light sources, for example laser light sources, while the detector unit may contain one or more optical detectors, for example photodiodes or avalanche photodiodes (APDs).

In the case of a radar system, the emitter units and the detector unit contain corresponding antennas for emitting or detecting radio waves.

In the case of an ultrasonic sensor system, the emitter units contain respective ultrasonic sources for emitting ultrasonic waves, and the detector unit contains an ultrasonic sensor or ultrasonic detector.

Depending on the specific embodiment of the active sensor system, the emitter units can also additionally assume the role of the detector unit or a corresponding detector of the detector unit, or vice versa. For example, antennas can be used to both transmit and receive radio waves, and ultrasonic transmitters can both emit and detect ultrasonic waves.

The first overlapping region can also be understood as meaning the intersection of the first emission spatial region with the detector field of view and the second overlapping region can accordingly be understood as meaning the intersection of the second emission spatial region with the detector field of view. In other words, any point that is both within the first emission spatial region and within the detector field of view is also within the first overlapping region. The same applies to the second overlapping region.

Accordingly, the sensor field of view can also be understood as meaning the union of the first overlapping region and the second overlapping region. In other words, any point that is within either the first overlapping region or the second overlapping region is also within the sensor field of view.

As stated above, the detector unit may contain one or more detectors, each of the detectors having a corresponding individual detector field of view. The detector field of view of the detector unit is then given, for example, by the union of all individual detector fields of view. In other words, any point that is in at least one of the individual detector fields of view is also in the detector field of view of the detector unit.

A detector signal can be understood, for example, as a time-dependent signal whose amplitude corresponds to an intensity of the portion of measurement signals that is detected by the detector unit or the respective detector.

The active sensor system can, for example, carry out a propagation time measurement on the basis of the at least one detector signal in order to determine a distance between the sensor system, in particular the detector unit, and that object from which the measurement signals were reflected.

In addition, the sensor system can have a one-dimensional or two-dimensional spatial resolution in such a way that the detector unit can differentiate between reflected portions of measurement signals from different angles of incidence. This can be made possible, for example, by the spatial arrangement of the detectors in the detector unit and/or by direction-dependent filter devices and/or by deflection devices which, at specific times, direct only reflected portions of measurement signals from specific directions of incidence to the detector unit.

In the case of a lidar sensor system, it can be in particular a laser scanner or a flash lidar system.

The fact that the at least one section is shaded with respect to an emitter unit can be understood in particular in such a way that the corresponding measurement signal does not reach the at least one section, even though it is within the corresponding emission spatial region. This can be the case, for example, if there is an object between the at least one section and the corresponding emitter, which object blocks the corresponding measurement signal. In this case, the object can be located either only in the first or only in the second emission spatial region or in the first or second overlapping region and can shade the at least one section with respect to an emitter unit.

In principle, a section that is shaded with respect to the first emitter unit is not necessarily also shaded with respect to the second emitter unit. However, if there is a further object in a section shaded by the first emitter unit, a section which is shaded both with respect to the first emitter unit and with respect to the second emitter unit may be located on that side of the further object which faces away from the second emitter unit. If, in turn, there are further objects in such sections that are shaded with respect to both emitter units, they cannot be detected by the sensor system unless the sensor system has yet further emitter units in addition to the first and second emitter units.

In particular, the measurement data set contains data relating to a position of one or more objects in the sensor field of view with respect to the sensor system, for example two-dimensional or three-dimensional coordinates of the objects. Alternatively or additionally, the measurement data set can also contain data which indicate this position information, for example relating to the respective angle of incidence of the detected measurement signals and the measured signal propagation time or the measured distance.

The measurement data set can also contain information relating to a corresponding signal intensity. The signal intensity can be correlated, for example, with a reflectivity or an apparent reflectivity of the corresponding reflective object.

In the case of a lidar sensor system, the measurement data set can correspond to or contain a lidar point cloud, for example.

The correction data for correcting the measurement data set can contain, for example, a spatial description or spatial definition of the at least one section or a spatial region or coordinates of a spatial region that specify the at least one section.

Optionally, the correction data can also contain instructions or information on how the measurement data set can be corrected, in particular for a measurement data set corresponding to the at least one section.

For example, the computing unit or a further computing unit, which is not necessarily part of the active sensor system, can lower a threshold value for the signal intensity for object detection for signals corresponding to the at least one section on the basis of the correction data. The computing unit or the further computing unit can also correct the signal intensity or correct or increase a confidence value for the measurement data set relating to the at least one section.

This makes it possible to take into account the fact that reflections from objects located in the at least one section lead to a reduced signal intensity of the corresponding reflected portions of the measurement signals, since they are at most reached by the first measurement signals or by the second measurement signals, but in any case not by both.

The fact that the measurement data set is generated taking into account the at least one identified section can be understood, for example, as meaning that measurement data in the measurement data set contain information about whether or not the corresponding measurement points are within the at least one section.

The improved concept therefore explicitly takes into account shaded sections of the sensor field of view. This provides more information that can be used by the sensor system or a downstream processing further computing unit, for example of an object characterization or object detection system, so that the reliability when processing the measurement data set is increased. The reliability of the measurement data set itself is thus increased, or it is made possible to increase the reliability during further processing of the measurement data set.

If necessary, the improved concept can therefore make it possible in the first place for measurement data relating to the at least one section to be taken into account or to be taken into account in a reliable manner. In other words, the effectively usable sensor field of view or an effectively usable detection range of the active sensor system is thereby increased.

Depending on the application of the active sensor system, the improved concept can also contribute to increased safety. For example, active sensor systems are used in motor vehicles, in particular to implement or support functions for partially automated or fully automated motor vehicle control. In such cases, the improved concept increases safety by increasing the reliability of the measurement data set or the processing of the measurement data set.

In particular, the first emission spatial region and the second emission spatial region differ from each other. In particular, the emission spatial regions overlap.

The first emitter unit and the second emitter unit are in particular arranged at different positions in the active sensor system.

In addition, the emitter units can be identical or substantially identical, for example.

The at least one section can be identified, for example, by identifying a corresponding object or a plurality of objects that cause the shading or shading effects. In particular, the computing unit can determine a position and extent of the identified object on the basis of the at least one detector signal. Based on the position and extent of the identified object, the computing unit can determine a spatial region that is shaded by the object. The intersection of this spatial region with the sensor field of view then corresponds, for example, to a section of the at least one section.

In various configurations, the first emitter unit and the second emitter unit can also emit the first and the second measurement signal in different ways or with different parameters. For example, the first and the second measurement signal can be provided with different time modulations or can be phase-shifted with respect to one another. Alternatively or additionally, the first and the second measurement signal can also be generated with different wavelengths.

This makes it possible for the detector unit to differentiate between the first and the second measurement signal. As a result, the at least one section can be identified more easily or more reliably.

In accordance with at least one embodiment, the computing unit is configured to generate an initial measurement data set on the basis of the at least one detector signal, in particular without taking into account the at least one section. The computing unit or the further computing unit is configured to generate the measurement data set on the basis of the initial measurement data set, taking into account the at least one section, or to generate the measurement data set on the basis of the correction data and the initial measurement data set.

According to at least one embodiment, the active sensor system contains at least one driver circuit that is configured to actuate the first emitter unit and the second emitter unit to emit the first measurement signal and the second measurement signal.

In this case, the at least one driver circuit can be configured to actuate the emitter units to emit the first and the second measurement signal in a synchronized manner.

This leads in particular to the detector unit not distinguishing between the first and the second measurement signal in order to generate the at least one detector signal. In such a case, the shading means that the corresponding detector signal indicates a reduced signal intensity or has a lower amplitude. In such embodiments, the computing unit or the further computing unit can correct the amplitude or the signal intensity or lower a corresponding threshold value for the signal intensity, in particular on the basis of the correction data.

According to at least one embodiment, the at least one driver circuit is configured to actuate the emitter units to emit the measurement signals in an asynchronous manner.

The detector unit is then configured, for example, to detect the first measurement signals and the second measurement signal independently of one another.

In the case of an object in the at least one section, the object is then detected, for example, only by means of the first measurement signals or only by means of the second measurement signals. On the basis of the information relating to the at least one section, the computing unit or the further computing unit can then increase a confidence value for the detection of the object, for example. This makes it possible to take into account the fact that it is not noise or another error, for instance, that causes the object to be only partially detected, but rather the fact that the at least one section is shaded with respect to the first or the second emitter unit.

According to at least one embodiment, the computing unit is configured to identify, on the basis of the at least one detector signal, at least one first section of the sensor field of view which is shaded with respect to the first emitter unit and is not shaded with respect to the second emitter unit, in particular in order to identify the at least one section.

In other words, identifying the at least one section includes identifying the at least one first section.

If there is thus an object in the at least one first section, it can be detected by the sensor system by virtue of the second measurement signal being emitted by the second emitter unit, being reflected by the object and being detected by the detector unit. However, since this object is not reached by the first measurement signal, a corresponding signal intensity of the at least one detector signal will be reduced, for example, or, depending on the embodiment of the sensor system, a confidence value for detecting the object will be reduced. As a result of the fact that the at least one first section is identified in corresponding embodiments, this can be taken into account when generating the measurement data set or the correction data, with the result that that such objects can also be reliably recognized or the information about the existence of the object in the at least one first section can be accordingly taken into account in the further processing of the measurement data set.

These explanations apply analogously to embodiments in which the computing unit is configured to identify, on the basis of the at least one detector signal, at least one further first section of the sensor field of view which is shaded with respect to the second emitter unit and is not shaded with respect to the first emitter unit.

According to at least one embodiment, the detector unit is configured to generate at least one first detector signal on the basis of portions of the second measurement signal which are reflected by an object in the at least one first section and/or to generate at least one further first detector signal on the basis of portions of the first measurement signal which are reflected by a further object in the at least one further first section.

According to at least one embodiment, the computing unit is configured to determine a first signal intensity on the basis of the at least one first detector signal, to modify the first signal intensity according to a predefined first correction rule and to generate the measurement data set depending on the modified first signal intensity.

The predefined first correction rule can be part of the correction data, for example, or can have been specified in advance.

Modifying the first signal intensity includes in particular increasing or raising the value of the first signal intensity, in particular in order to take into account the fact that the first measurement signal does not contribute to the generation of the at least one first detector signal, but only the second measurement signal. For example, modifying may include multiplying the first signal intensity by a correction term or adding a correction term to the first signal intensity.

The correction term can be constant or can be defined according to a predefined characteristic of the sensor system. The characteristic can be stored, for example, in a memory unit of the sensor system, for example in the form of a lookup table.

In the simplest case, the first signal intensity can be multiplied by a constant factor, for example, in order to take into account the absence of the reflected portions of the first measurement signal.

Modifying the signal intensity makes it possible to achieve in particular the situation in which the corresponding parts of the measurement data set can be sufficiently or appropriately taken into account during further processing, for example when comparing the value of the signal intensity with a threshold value, for example in order to distinguish actual measurement data from noise.

Objects located in the at least one first section can then be taken into account with greater reliability or in the first place when processing or creating the measurement data set, which leads to a more reliable measurement data set or more reliable processing of the measurement data set overall.

Instead of increasing the signal intensity as described, it goes without saying that a corresponding threshold value can also be correspondingly lowered for measurements relating to the at least one first section.

According to at least one embodiment, the computing unit is configured to determine a measurement point, in particular for the object in the at least first section, and a confidence value for the measurement point on the basis of the at least one first detector signal. The computing unit is configured to modify the confidence value in accordance with a predefined second correction rule and to generate the measurement data set depending on the measurement point and the modified confidence value.

The measurement point contains in particular data relating to the position of the object or a part of the object, i.e. in particular two-dimensional or three-dimensional coordinates. The measurement point is stored in the measurement data set together with the confidence value.

For example, the confidence value can be viewed as a measure of the probability that the measurement point, i.e. its existence or position, is correct.

Modifying the confidence value includes in particular increasing the confidence value, i.e. in particular a further correction term is added to the confidence value or multiplied by the confidence value in order to modify the confidence value.

In particular in the case of asynchronously operated sensor systems in which the detector unit is configured to generate different detector signals for the reflected portions of the first measurement signal and the reflected portions of the second measurement signal, such embodiments are advantageous since this makes it possible to compensate for the fact that, instead of the detection on the basis of the first and the second measurement signal, only a detection on the basis of the second measurement signal takes place when the object is in the at least one first section.

According to at least one embodiment, the computing unit is configured to generate first information for assigning the at least one section to at least one corresponding first part of the measurement data set.

In particular, the first information allows an assignment as to which measurement points in the measurement data set are due to reflections of the second measurement signal which originate from the at least one first section.

The first information can be part of the correction information, for example.

The first information can define, for example, the spatial position and extent of the at least one first section.

Alternatively or additionally, labels or flags can be provided in the individual measurement points in the measurement data set and indicate when the measurement point is within the at least one first section.

Providing the first information makes it possible to take into account the fact that the at least one first section is shaded during further processing of the measurement data set.

In particular, the at least one first section can thereby be communicated to the further computing unit as a region with lower trustworthiness or reduced performance.

According to at least one embodiment, the computing unit is configured to identify, on the basis of the at least one detector signal, at least one second section of the sensor field of view which is shaded with respect to the first emitter unit and is shaded with respect to the second emitter unit.

This can be done, for example, by identifying the at least one first section as described and also determining that there is an object in the at least one first section. That region of the field of view which is directly behind this object with respect to the second emitter unit can then be shaded with respect to both emitter units, for example.

In such embodiments, the existence of the at least one second section can be taken into account and thus also the potential possibility that there are further objects in the at least one second section which, however, cannot be detected despite the redundancy of the first and the second emitter unit.

The at least one second section can therefore be taken into account as a region with little or no confidence or trustworthiness when creating or processing the measurement data set.

In embodiments in which the detector unit contains more than two emitter units, the at least one second section can be identified, for example, in such a way that it is shaded with respect to all emitter units of the sensor system.

According to at least one embodiment, the computing unit is configured to generate second information for assigning the at least one second section to at least one corresponding second part of the measurement data set and to transmit it to the further computing unit.

The explanations for the first information above apply here analogously.

According to at least one embodiment, the detector unit has a first detector with a first field of view and a second detector with a second field of view. The detector field of view is given by the first field of view and the second field of view.

In particular, the detector field of view corresponds to a union of the first and second fields of view, or, in other words, any point that is in the first field of view or in the second field of view is also in the detector field of view.

This enables a potentially larger detection range of the sensor system by increasing the detector field of view. In addition, a higher level of reliability and security is made possible through redundancy.

According to at least one embodiment, the detector unit has a large number of detectors with respective associated individual fields of view and the detector field of view is given by all individual fields of view, i.e. in particular by a union of all individual fields of view.

According to at least one embodiment, the active sensor system is designed as a lidar system, in particular as a flash lidar system or as a laser scanner.

The emitter units then each contain in particular one or more light sources, in particular laser diodes, for example infrared laser diodes. The detector unit or the individual detectors of the detector unit then each contain, for example, one or more photodiodes, for example avalanche photodiodes.

According to at least one embodiment, the active sensor system is designed as a radar system.

According to the improved concept, an object characterization system is also specified. The system has an active sensor system according to the improved concept, as well as a further computing unit that is configured to recognize or characterize an object, in particular the object in the at least one first section, in the sensor field of view on the basis of the measurement data set to characterize it on the basis of the measurement data set and the correction data.

For example, characterizing the object may be understood to include determining one or more properties of the object. The object characterization can therefore include object recognition, object classification and/or object tracking and so on.

In this case, the further computing unit can partially or completely contain the computing unit.

According to at least one embodiment in which the further computing unit is configured to characterize the object on the basis of the measurement data set and the correction data, the computing unit or the further computing unit is configured to correct the measurement data set on the basis of the correction data, and the further computing unit is configured to characterize the object on the basis of the corrected measurement data set.

According to at least one embodiment of the object characterization system, the computing unit is configured to generate first information for assigning the at least one first section to at least one corresponding first part of the measurement data set and to transmit it to the further computing unit. The further computing unit is configured to characterize the object, which is located in the at least one first section, depending on the first information and/or to initiate a risk-reducing measure depending on the first information.

According to at least one embodiment, the further computing unit is configured to modify, in particular to lower, a threshold value for object recognition with regard to the at least one first section depending on the first information.

According to at least one embodiment, the computing unit is configured to generate the second information for assigning the at least one second section to the at least one corresponding second part of the measurement data set and to transmit it to the further computing unit. The further computing unit is configured to characterize the object depending on the second information and/or to initiate a further risk-reducing measure depending on the second information.

According to the improved concept, a motor vehicle containing an active sensor system or an object characterization system according to the improved concept is also specified.

The first emitter unit and the second emitter unit are installed at different positions in the motor vehicle, for example.

According to the improved concept, a method for generating a measurement data set by means of an active sensor system is also specified, wherein the sensor system, in particular the first emitter unit, is used to emit a first measurement signal into a first emission spatial region in an environment of the sensor system and the sensor system, in particular the second emitter unit, is used to emit a second measurement signal into a second emission spatial region in the environment. A sensor field of view of the active sensor system is given by a first overlapping region of the first emission spatial region with a detector field of view of the active sensor system, in particular a detector unit of the active sensor system, and by a second overlapping region of the second emission spatial region with the detector field of view. At least one detector signal is generated, in particular by means of the detector unit, on the basis of portions of the first measurement signal and/or of the second measurement signal which are reflected in the sensor field of view. The measurement data set is generated on the basis of the at least one detector signal, in particular by means of a computing unit of the active sensor system. On the basis of the at least one detector signal, at least one section of the sensor field of view which is shaded with respect to the first emitter unit and/or with respect to the second emitter unit is identified, in particular by means of the computing unit. The measurement data set is generated, in particular by means of the computing unit, taking into account the identified at least one section and/or correction data for correcting the measurement data set are generated on the basis of the at least one section.

Further embodiments of the method for generating a measurement data set according to the improved concept follow directly from the various embodiments of the active sensor system according to the improved concept and the embodiments of an object characterization system according to the improved concept and vice versa in each case. In particular, an active sensor system according to the improved concept is configured to carry out a method for generating a measurement data set according to the improved concept and carries out such a method.

According to the improved concept, a method for characterizing objects by means of an active sensor system is also specified. In this case, a measurement data set is generated by means of the active sensor system according to a method for generating a measurement data set according to the improved concept, and an object in the sensor field of view is characterized on the basis of the measurement data set, in particular by means of a further computing unit, is characterized on the basis of the measurement data set or on the basis of the measurement data set and the correction data.

Further embodiments of the method for characterizing objects according to the improved concept follow directly from the various configurations of the active sensor system and of the object characterization system according to the improved concept and vice versa in each case. In particular, an object characterization system according to the improved concept can be configured or programmed to carry out a method for characterizing objects according to the improved concept or carries out such a method.

A computer program having instructions is also specified according to the improved concept. When executing the instructions or when executing the computer program by means of an active sensor system according to the improved concept, in particular by means of the computing unit of the active sensor system, the instructions cause the sensor system to carry out a method for generating a measurement data set according to the improved concept.

According to the improved concept, a further computer program having further instructions is also specified. When executing the further instructions by means of an object characterization system according to the improved concept, in particular by means of the computing unit or the further computing unit of the system, the further instructions cause the sensor system to carry out a method for characterizing objects according to the improved concept.

According to the improved concept, a computer-readable storage medium which stores a computer program and/or a further computer program according to the improved concept is also specified.

The computer program, the further computer program and the computer-readable storage medium can each be regarded as a computer program product having the corresponding instructions.

Further features of the invention are evident from the claims, the figures, and the description of the figures. The features and combinations of features mentioned above in the description and the features and combinations of features mentioned below in the description of the figures and/or shown in the figures alone can be included in the improved concept not only in the combination specified in each case, but also in other combinations. Thus, those embodiments of the improved concept which are not explicitly shown and/or explained in the figures, but emerge and can be produced from the explained embodiments by virtue of separate combinations of features, are also included and disclosed. Thus, in particular, embodiments and combinations of features which do not have all the features of an originally worded claim are also included and disclosed. Furthermore, embodiments and combinations of features which go beyond or differ from the combinations of features set out in the back-references of the claims are included and disclosed.

DETAILED DESCRIPTION

Figure 1:
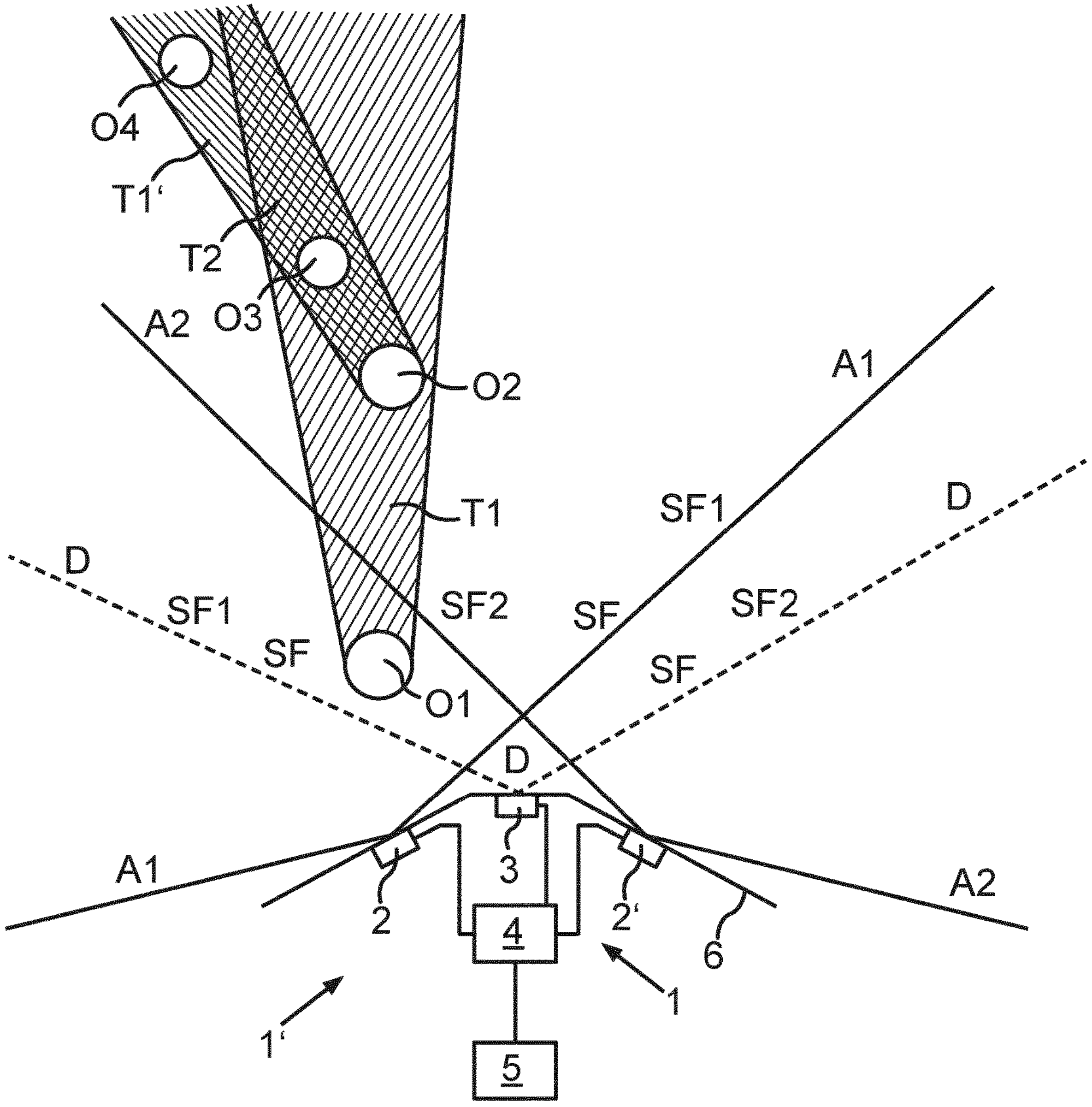
FIG. 1 shows a schematic representation of an exemplary embodiment of an object characterization system according to the improved concept and of an active sensor system according to the improved concept.

FIG. 1 schematically shows an object characterization system 1' according to the improved concept, which has an active sensor system 1 according to the improved concept. For example, the active sensor system 1 is designed as a lidar system in the present case.

The active sensor system 1 has a first emitter unit 2 and a second emitter unit 2', which are arranged at spatially different positions. For example, the emitter units 2, 2' can be installed at different positions in a motor vehicle 6. In addition, the sensor system 1 has a detector unit 3.

The emitter units 2, 2' can be designed as infrared laser light sources, for example. The detector unit 3 can include one or more avalanche photodiodes, APDs, for example.

The sensor system 1 also has a computing unit 4 which can be designed as a control and processing unit, for example. For example, the computing unit 4 can actuate the emitter units 2, 2' and/or the detector unit 3.

The emitter units 2, 2' and the detector unit 3 can have corresponding driver circuits, for example, or such driver circuits can be included in the computing unit 4.

The computing unit 4 can actuate the emitter units 2, 2' so that the first emitter unit 2 emits first measurement signals into a first emission spatial region A1 and the second emitter unit 2' emits second measurement signals into a second emission spatial region A2.

The detector unit 3 has a detector field of view D, that is to say in particular can only detect light that runs from the detector field of view D in the direction of the detector unit 3.

The first emission spatial region A1 overlaps the detector field of view D in a first overlapping region SF1 and the second emission spatial region A2 overlaps the detector field of view D in a second overlapping region SF2. Points in space that are either in the first overlapping region SF1 or in the second overlapping region SF2 form a sensor field of view SF of the active sensor system 1.

In other words, the sensor system 1 can basically recognize objects that are located in the sensor field of view SF. If an object O1 is located, for example, in the first overlapping region SF1 but not in the second overlapping region SF2, the object can reflect the first measurement signals and the detector unit 3 can detect these reflected portions. The same applies analogously to objects that are located in the second overlapping region SF2 but not in the first overlapping region SF1.

Objects O4, O3, O4, which are located both in the first and in the second overlapping region SF1, SF2, can in principle be reached by the first measurement signal and by the second measurement signal, can reflect said signals, and the detector unit 3 can detect the corresponding reflections.

However, if an object O1 is located in the sensor field of view SF, this object O1 may shade a first section T1 with respect to the first emitter unit 2 or the second emitter unit 2'. If there are a plurality of objects O1, O2 in the sensor field of view SF, this can also lead to second spatial regions T2 in which there is shading with respect to both emitter units 2, 2'.

FIG. 1 shows an example of a situation in which a first object O1 is located in the first overlapping region SF1, but outside the second overlapping region SF2. A first section T1, which is shaded with respect to the first emitter unit 2, results accordingly. For example, a second object O2 is located within the first and second overlapping regions SF1, SF2 and also within the first section T1. The second object O2 therefore cannot be reached by the first measurement signal, but can be reached by the second measurement signal. On a side of the second object O2 that is remote from the second emitter unit 2', however, there is now a second section T2 of the sensor field of view SF which is shaded both with respect to the first emitter unit 2 and with respect to the second emitter unit 2', with the result that a third object O3, which is located in this second section T2, cannot be detected by the sensor system 1.

However, in the present example, the second object O2 also generates a further first section T1' which is shaded with respect to the second emitter unit 2', but not with respect to the first emitter unit 2. FIG. 1 shows, by way of example, a fourth object O4 which is located in the further first section T1'. This object can be detected by the sensor system 1 by virtue of the first measurement signal being reflected by the object O4 and the corresponding reflections being able to be detected by the detector unit 3.

It is pointed out that the objects O1, O2, O3, O4 shown in FIG. 1 only serve to illustrate different situations with regard to different shading events. Even if the object O1 is in the first emission spatial region A1, but not in the detector field of view D, shading, e.g. of the object O2 with respect to the first emitter unit 2, can be identified via position information on O2 relative to the emitter unit 2' and the detector unit 3.

The detector unit 3 generates at least one detector signal on the basis of the reflected portions of the first and/or the second measurement signal, which are detected by the detector unit 3.

The computing unit 4 can identify the first sections T1, T1' or the second section T2 on the basis of the at least one detector signal. The computing unit 4 can generate a measurement data set, in particular a lidar point cloud, on the basis of the at least one detector signal, taking into account the at least one section T1, T1', T2. Alternatively or additionally, the computing unit can generate correction data for correcting the measurement data set on the basis of the sections T1, T1', T2.

The computing unit 4 can transmit the measurement data set and/or the correction data to the further computing unit 5. The further computing unit 5 is configured, for example, to recognize or characterize one or more of the objects O1, O2, O3, O4 on the basis of the measurement data set and/or on the basis of the correction data or to carry out further processing.

Figure 2:
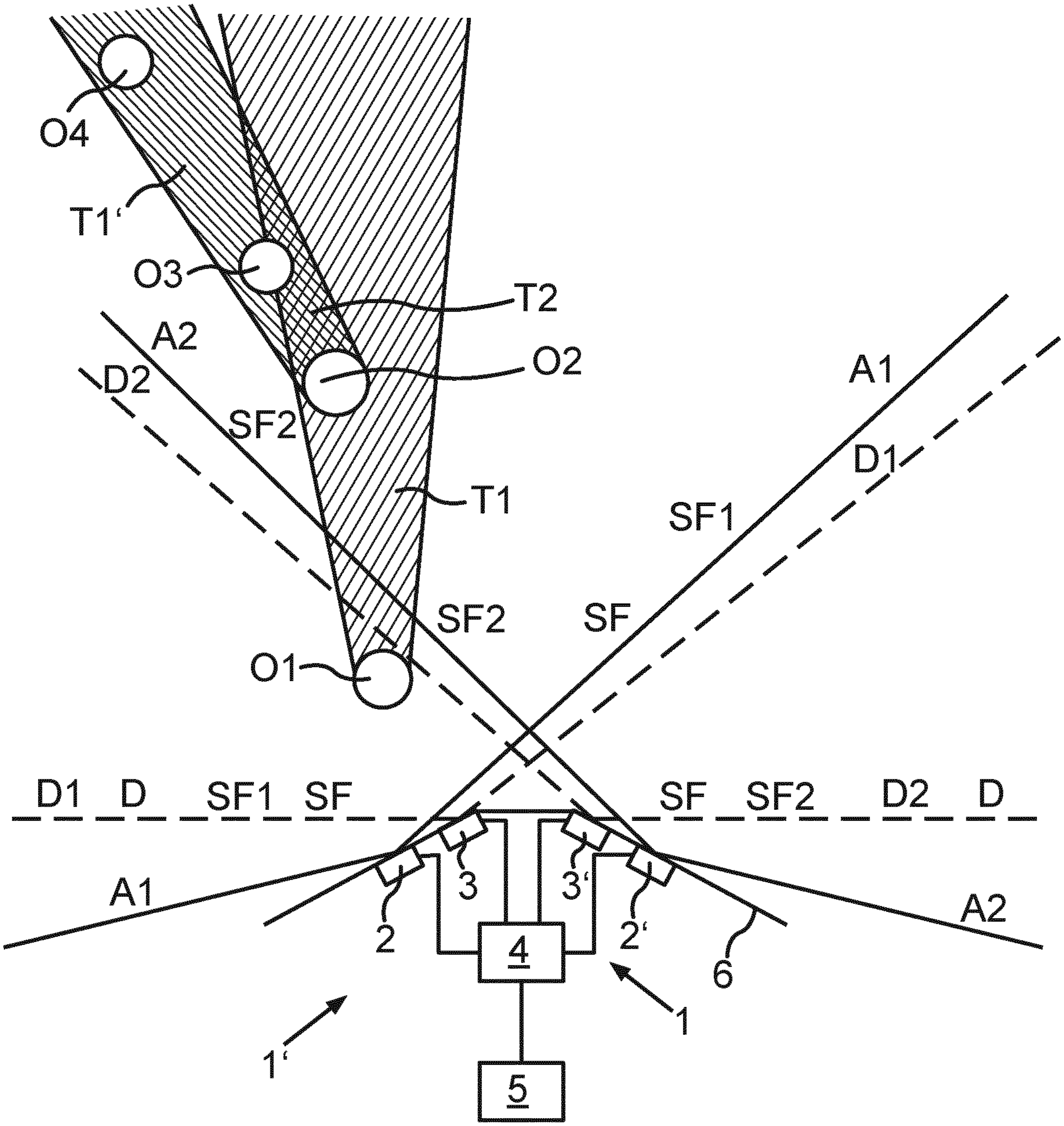
FIG. 2 shows a schematic representation of a further exemplary embodiment of an object characterization system and of an active sensor system according to the improved concept.

A further exemplary embodiment of the system 1' or of the sensor system 1 is shown in FIG. 2.

The sensor system 1 in FIG. 2 contains a further detector unit 3', which is designed analogously to the detector unit 3, for example. The detector units 3, 3' can also be understood together as a common detector unit.

As explained with reference to FIG. 1, the detector unit 3 has a first detector field of view D1 and the further detector unit 3' has a second detector field of view D2. The union of the detector fields of view D1, D2 forms the detector field of view D here.

As a result, the detection range of the sensor system 1 is further increased. Otherwise, the explanations regarding the sensor system 1 in FIG. 1 apply here analogously.

As described, the problem of shading in active sensor systems 1 having a plurality of emitter units 2, 2' can be countered by means of the improved concept.

The amplitudes of the detector signals, i.e. their signal strength, are reduced by the shading. This can affect the characterization of the objects O1, O2, O3, O4. For example, image processing or machine vision algorithms, such as algorithms based on artificial intelligence methods, would have to recognize shading by other objects in advance. In order to simplify the complexity of the problem, the improved concept provides for the characteristics of shaded regions to be corrected.

For this purpose, for example, a measure of the signal strength or a variable applied thereto or based thereon can be used.

In a situation as illustrated in FIGS. 1 and 2, the shading is evaluated, viewed from the sensor system 1, in particular from the front to the rear. In other words, the computing unit 4 first recognizes the first object O1, corrects the characteristics in the shaded region T1, then recognizes the object O2 and corrects the characteristics for the further shaded region T1 and the second section T2.

The sections T1 and/or T2 can be communicated to the further computing unit 5 separately from one another or together as regions of low trustworthiness and/or reduced performance.

According to the improved concept, the detector signals, for example, are therefore generated first, then the objects that shade certain sections T1, T1', T2 are recognized. Corresponding correction values for the confidence or for the signal strength can then be calculated or read in and the characteristics, i.e. in particular signal strength or confidence values, in the shaded regions T1, T1', T2 can be corrected using the computing unit 4.

The further computing unit 5 can then further process the corrected measurement data or the measurement data set in a correspondingly reliable manner.

The invention claimed is:

1. An active sensor system comprising:

a first emitter unit, a second emitter unit, a detector unit and a computing unit, wherein:

the first emitter unit is configured to emit a first measurement signal into a first emission spatial region in an environment of the sensor system;

the second emitter unit is configured to emit a second measurement signal into a second emission spatial region in the environment;

a sensor field of view is given by a first overlapping region of the first emission spatial region with a detector field of view of the detector unit and by a second overlapping region of the second emission spatial region with the detector field of view;

the detector unit is configured to generate at least one detector signal on the basis of portions of the first measurement signal and/or of the second measurement signal which are reflected in the sensor field of view; and the computing unit is configured to generate a measurement data set on the basis of the at least one detector signal, wherein the computing unit is configured to:

explicitly classify, on the basis of the at least one detector signal, at least one section of the sensor field of view as being shaded with respect to the first emitter unit and/or with respect to the second emitter unit; and generate the measurement data set by modifying at least one measurement value and/or an associated confidence value of the measurement data set based on the classification of the at least one section and to generate correction data for correcting the measurement data set on the basis of the at least one section.

2. The active sensor system as claimed in claim 1, wherein the computing unit is configured to identify, on the basis of the at least one detector signal, at least one first section of the sensor field of view which is shaded with respect to the first emitter unit and is not shaded with respect to the second emitter unit.

3. The active sensor system as claimed in claim 2, wherein the detector unit is configured to generate at least one first detector signal on the basis of portions of the second measurement signal which are reflected by an object in the at least one first section.

4. The active sensor system as claimed in claim 3, wherein the computing unit is configured to determine a first signal intensity on the basis of the at least one first detector signal, to modify the first signal intensity according to a predefined first correction rule, and to generate the measurement data set depending on the modified first signal intensity.

5. The active sensor system as claimed in claim 4, wherein the computing unit is configured to determine a measurement point and a confidence value for the measurement point on the basis of the at least one first detector signal, to modify the confidence value according to a predefined second correction rule, and to generate the measurement data set depending on the measurement point and the modified confidence value.

6. The active sensor system as claimed in claim 1, wherein the computing unit is configured to identify, on the basis of the at least one detector signal, at least one second section of the sensor field of view which is shaded with respect to the first emitter unit and is shaded with respect to the second emitter unit.

7. The active sensor system as claimed in claim 1, wherein the detector unit has a first detector with a first field of view and a second detector with a second field of view, and the detector field of view is given by the first field of view and the second field of view.

8. The active sensor system as claimed in claim 1, wherein the active sensor system is one of a lidar system, a radar system, an ultrasonic sensor system.

9. An object characterization system comprising:

an active sensor system as claimed in claim 1; and a further computing unit which is configured to characterize an object in the sensor field of view on the basis of the measurement data set or on the basis of the measurement data set and the correction data.

10. The system as claimed in claim 9, wherein the active sensor system the computing unit is configured to:

identify, on the basis of the at least one detector signal, at least one first section of the sensor field of view which is shaded with respect to the first emitter unit and is not shaded with respect to the second emitter unit, generate first information for assigning the at least one first section to at least one corresponding first part of the measurement data set and to transmit it to the further computing unit, and characterize the object depending on the first information and/or to initiate a risk-reducing measure depending on the first information.

11. The system as claimed in claim 9, wherein the computing unit is configured to:

identify, on the basis of the at least one detector signal, at least one second section of the sensor field of view which is shaded with respect to the first emitter unit and is shaded with respect to the second emitter unit, generate second information for assigning the at least one second section to at least one corresponding second part of the measurement data set and to transmit it to the further computing unit, and characterize the object depending on the second information and/or to initiate a risk-reducing measure depending on the second information.

12. A method for generating a measurement data set by means of an active sensor system, the method comprising:

emitting, by a first emitter unit, a first measurement signal into a first emission spatial region in an environment of the sensor system and emitting, by a second emitter unit, a second measurement signal into a second emission spatial region in the environment;

providing a sensor field of view by a first overlapping region of the first emission spatial region and by a second overlapping region of the second emission spatial region with a detector field of view;

generating at least one detector signal on the basis of portions of the first measurement signal and/or of the second measurement signal which are reflected in the sensor field of view;

generating the measurement data set on the basis of the at least one detector signal; and explicitly classifying, on the basis of the at least one detector signal, at least one section of the sensor field of view as being shaded with respect to the first emitter unit and/or with respect to the second emitter unit, wherein the measurement data set is generated by modifying at least one measurement value and/or an associated confidence value of the measurement data set based on the classification of the identified at least one section, and wherein correction data for correcting the measurement data set are generated on the basis of the at least one section.

13. The method as claimed in claim 12, further comprising:

identifying, on the basis of the at least one detector signal, at least one first section of the sensor field of view which is shaded with respect to the first emitter unit and is not shaded with respect to the second emitter unit is identified; and/or on the basis of the at least one detector signal, at least one second section of the sensor field of view which is shaded with respect to the first emitter unit and is shaded with respect to the second emitter unit is identified.

14. A method for characterizing objects by an active sensor system, the method comprising:

generating a measurement data set by the active sensor system according to the method as claimed in claim 12; and characterizing an object in the sensor field of view on the basis of the measurement data set or on the basis of the measurement data set and the correction data.

* * * * *